(12) United States Patent
Yang et al.

(10) Patent No.: US 12,481,064 B2
(45) Date of Patent: Nov. 25, 2025

(54) IMAGE FUSION METHOD, HYPERSPECTRAL LIDAR SENSOR, AND HYPERSPECTRAL LIDAR SYSTEM

(71) Applicant: Information Technology Research Center, Beijing Academy of Agriculture and Forestry Sciences, Beijing (CN)

(72) Inventors: Guijun Yang, Beijing (CN); Hao Yang, Beijing (CN); Bo Xu, Beijing (CN); Xiaodong Yang, Beijing (CN); Haikuan Feng, Beijing (CN); Huiling Long, Beijing (CN); Xingang Xu, Beijing (CN); Xiaoyu Song, Beijing (CN)

(73) Assignee: Information Technology Research Center, Beijing Academy of Agriculture and Forestry Sciences, Beijing (CN)

( * ) Notice: Subject to any disclaimer, the term of this patent is extended or adjusted under 35 U.S.C. 154(b) by 0 days.

(21) Appl. No.: 19/058,398

(22) Filed: Feb. 20, 2025

(65) Prior Publication Data

US 2025/0284005 A1 Sep. 11, 2025

(30) Foreign Application Priority Data

Mar. 11, 2024 (CN) .......................... 202410269801.1

(51) Int. Cl.
*G01S 17/86* (2020.01)
*G01S 17/89* (2020.01)
*H04N 23/13* (2023.01)

(52) U.S. Cl.
CPC .............. *G01S 17/86* (2020.01); *G01S 17/89* (2013.01); *H04N 23/13* (2023.01)

(58) Field of Classification Search
CPC ....................................................... G01S 17/86
See application file for complete search history.

(56) References Cited

U.S. PATENT DOCUMENTS

2018/0067209 A1* 3/2018 Bishop ................... G01N 21/31
2021/0396853 A1* 12/2021 Zhou ....................... G01S 17/32

OTHER PUBLICATIONS

Brell et al., "Improving Sensor Fusion: A Parametric Method for the Geometric Coalignment of Airborne Hyperspectral and Lidar Data," in IEEE Transactions on Geoscience and Remote Sensing, vol. 54, No. 6, pp. 3460-3474, Jun. 2016. (Year: 2016).*

(Continued)

*Primary Examiner* — Yashita Sharma
*Assistant Examiner* — Zhengqing Qi
(74) *Attorney, Agent, or Firm* — Leason Ellis LLP

(57) ABSTRACT

This application provides an image fusion method, a hyperspectral lidar sensor, and a hyperspectral lidar system. The method includes: calibrating time of a laser scanner, a spectrometer, and an inertial measurement unit (IMU) based on time of an atomic clock of a global positioning system (GPS); controlling the laser scanner to perform scanning imaging on a detection area to obtain a three-dimensional (3D) point cloud image, and controlling the laser scanner to trigger the spectrometer to perform spectral imaging on the detection area to obtain a hyperspectral image; controlling the GPS and the IMU to perform signal collection to obtain a GPS signal and an IMU signal; and sending the 3D point cloud image, the hyperspectral image, the GPS signal, and the IMU signal to an image processing device, which fuses the 3D point cloud image and the hyperspectral image based on the GPS signal and the IMU signal.

3 Claims, 4 Drawing Sheets

(56) References Cited

OTHER PUBLICATIONS

Li et al., "Two-Step LiDAR/Camera/IMU Spatial and Temporal Calibration Based on Continuous-Time Trajectory Estimation," in IEEE Transactions on Industrial Electronics, vol. 71, No. 3, pp. 3182-3191. (Year: 2023).*
Yan et al., "Joint Camera Intrinsic and LiDAR-Camera Extrinsic Calibration," 2023 IEEE International Conference on Robotics and Automation (ICRA), London, United Kingdom, 2023. (Year: 2023).*
Junior et al., "Rigorous Calibration of UAV-Based LiDAR Systems with Refinement of the Boresight Angles Using a Point-to-Plane Approach," Sensors (Basel). Nov. 28, 2019;19(23):5224. (Year: 2019).*
Notification to Grant Patent Right for Invention in CN Application No. 202410269801.1, mailed Apr. 18, 2024, an English Translation attached hereto (3 pages).

* cited by examiner

IMAGE FUSION METHOD, HYPERSPECTRAL LIDAR SENSOR, AND HYPERSPECTRAL LIDAR SYSTEM

CROSS REFERENCE TO RELATED APPLICATION

This patent application claims the benefit and priority of Chinese Patent Application No. 202410269801.1, filed with the China National Intellectual Property Administration on Mar. 11, 2024, the disclosure of which is incorporated by reference herein in its entirety as part of the present application.

TECHNICAL FIELD

The present disclosure relates to the technical field of hyperspectral lidars, and specifically, to an image fusion method, a hyperspectral lidar sensor, and a hyperspectral lidar system.

BACKGROUND

Hyperspectral lidar equipment is widely applied in geological, marine, agricultural, and other fields due to its ability to obtain various types of data information of a target object, such as a hyperspectral image and a three-dimensional (3D) point cloud image.

After the hyperspectral lidar equipment obtains the hyperspectral image and the 3D point cloud image of the target object, an external device is also required to fuse the hyperspectral image and the 3D point cloud image to comprehensively analyze the various types of data information of the target object, thereby accurately detecting and analyzing the target object.

The hyperspectral image and the 3D point cloud image are respectively formed by a spectrometer and a laser scanner in the hyperspectral lidar equipment through data collection. On one hand, imaging moments of the spectrometer and the laser scanner are not synchronized, which makes the spectrometer and the laser scanner have different imaging positions and postures. As a result, there is a significant geometric error between the obtained hyperspectral image and the obtained 3D point cloud image. On the other hand, in the existing hyperspectral lidar equipment, the spectrometer and the laser scanner use their own position and orientation systems (POSs) to determine their own positions and postures, but there is also a data error between the two POSs. When data from these two POSs is used to process the hyperspectral image and the 3D point cloud image respectively, the geometric error between the hyperspectral image and the 3D point cloud image is further increased. A traditional image fusion method mainly involves post-processing such as geometric registration for the hyperspectral image and the 3D point cloud image, but an existing geometric registration technique cannot eliminate the geometric error, resulting in low fusion precision of the hyperspectral image and the 3D point cloud image.

SUMMARY

Embodiments of the present disclosure provide an image fusion method, a hyperspectral lidar sensor, and a hyperspectral lidar system to solve a technical problem that a traditional image fusion method cannot eliminate a geometric error between a hyperspectral image and a 3D point cloud image, resulting in low fusion precision of the hyperspectral image and the 3D point cloud image.

According to a first aspect, an embodiment of the present disclosure provides an image fusion method, applied to a microcontroller of a hyperspectral lidar sensor, and including:
  calibrating time of a laser scanner, a spectrometer, and an inertial measurement unit (IMU) based on time of an atomic clock of a global positioning system (GPS);
  controlling the laser scanner to perform scanning imaging on a detection area to obtain a 3D point cloud image, and controlling the laser scanner to trigger the spectrometer to perform spectral imaging on the detection area to obtain a hyperspectral image, where an imaging moment of the spectrometer is determined based on a triggering moment of the laser scanner;
  controlling the GPS and the IMU to perform signal collection to obtain a GPS signal and an IMU signal; and
  sending the 3D point cloud image, the hyperspectral image, the GPS signal, and the IMU signal to an image processing device other than the hyperspectral lidar sensor, such that the image processing device fuses the 3D point cloud image and the hyperspectral image based on the GPS signal and the IMU signal; where
  the hyperspectral lidar sensor includes the laser scanner, the spectrometer, the GPS, and the IMU.

In an embodiment, the imaging moment of the spectrometer is determined based on exposure duration of a spectral band and the triggering moment of the laser scanner.

In an embodiment, before the calibrating time of a laser scanner, a spectrometer, and an IMU based on time of an atomic clock of a GPS, the image fusion method includes:
  adjusting internal structures of the laser scanner and the spectrometer;
  scaling and verifying internal parameters of the laser scanner and the spectrometer; and
  scaling and verifying external parameters of the laser scanner, the spectrometer, the GPS, and the IMU.

In an embodiment, the scaling and verifying external parameters of the laser scanner, the spectrometer, the GPS, and the IMU includes:
  statically measuring a rotation parameter and a translation parameter between every two of center positions of the laser scanner, the spectrometer, the GPS, and the IMU indoors to obtain a first rotation parameter and a first translation parameter;
  when the hyperspectral lidar sensor moves in an outdoor flight scaling and verification field, dynamically measuring the rotation parameter and the translation parameter between the every two of the center positions of the laser scanner, the spectrometer, the GPS, and the IMU to obtain a second rotation parameter and a second translation parameter; and
  resolving and correcting the center positions of the laser scanner, the spectrometer, the GPS, and the IMU based on the first rotation parameter, the first translation parameter, the second rotation parameter, the second translation parameter, and control point coordinates of the outdoor flight scaling and verification field.

According to a second aspect, an embodiment of the present disclosure provides an image fusion method, applied to an image processing device other than a hyperspectral lidar sensor, and including:
  receiving a 3D point cloud image, a hyperspectral image, a GPS signal, and an IMU signal that are sent by a microcontroller; and fusing the 3D point cloud image and the hyperspectral image based on the GPS signal and the IMU signal; where the 3D point cloud image is obtained by the microcontroller controlling a laser scanner to perform scanning imaging on a detection area, the hyperspectral image is obtained by the microcontroller controlling the laser scanner to trigger a spectrometer to perform spectral imaging on the detection area, the GPS signal is collected by a GPS under control of the microcontroller, the IMU signal is collected by an IMU under the control of the microcontroller, and an imaging moment of the spectrometer is determined based on a triggering moment of the laser scanner; and the hyperspectral lidar sensor includes the laser scanner, the spectrometer, the GPS, and the IMU.

In an embodiment, the fusing the 3D point cloud image and the hyperspectral image based on the GPS signal and the IMU signal includes:

using a first POS trajectory of the laser scanner at an imaging moment to resolve the 3D point cloud image to obtain a resolved image;

using a second POS trajectory of the spectrometer at the imaging moment to perform geometric processing on the hyperspectral image to obtain a processed image, where the first POS trajectory and the second POS trajectory come from a same POS data source, and the POS data source is determined based on the GPS signal and the IMU signal; and fusing the resolved image and the processed image.

In an embodiment, the POS data source is determined based on a following method:

determining, based on the GPS signal and the IMU signal, a POS trajectory along which the hyperspectral lidar sensor moves in the detection area; and determining the POS trajectory along which the hyperspectral lidar sensor moves in the detection area as the POS data source.

According to a third aspect, an embodiment of the present disclosure provides a hyperspectral lidar sensor, including a microcontroller, a laser scanner, a spectrometer, a GPS, and an IMU, where the microcontroller is configured to:
calibrate time of the laser scanner, the spectrometer, and the IMU based on time of an atomic clock of the GPS;
control the laser scanner to perform scanning imaging on a detection area to obtain a 3D point cloud image, and control the laser scanner to trigger the spectrometer to perform spectral imaging on the detection area to obtain a hyperspectral image, where an imaging moment of the spectrometer is determined based on a triggering moment of the laser scanner;
control the GPS and the IMU to perform signal collection to obtain a GPS signal and an IMU signal; and
send the 3D point cloud image, the hyperspectral image, the GPS signal, and the IMU signal to an image processing device other than the hyperspectral lidar sensor, such that the image processing device fuses the 3D point cloud image and the hyperspectral image based on the GPS signal and the IMU signal.

In an embodiment, the laser scanner is a surveying-grade laser scanner;
the spectrometer is a hyperspectral snapshot camera;
spectral resolution of the spectrometer is less than 8 nanometers; and
a spectral imaging band of the spectrometer comprises a band near 531 nanometers, a band near 570 nanometers, a band distributed between 540 nanometers and 570 nanometers, a band distributed between 670 nanometers and 780 nanometers, a band distributed between 620 nanometers and 670 nanometers, a band distributed between 780 nanometers and 860 nanometers, and a band near 865 nanometers.

According to a fourth aspect, an embodiment of the present disclosure provides a hyperspectral lidar system, including an image processing device and the hyperspectral lidar sensor described in the third aspect, where the image processing device is configured to:
receive a 3D point cloud image, a hyperspectral image, a GPS signal, and an IMU signal that are sent by a microcontroller; and
fuse the 3D point cloud image and the hyperspectral image based on the GPS signal and the IMU signal.

The image fusion method provided in the present disclosure calibrates time of a laser scanner, a spectrometer, and an IMU based on time of an atomic clock of a GPS; controls the laser scanner to perform scanning imaging on a detection area to obtain a 3D point cloud image, and controls the laser scanner to trigger the spectrometer to perform spectral imaging on the detection area to obtain a hyperspectral image; controls the GPS and the IMU to perform signal collection to obtain a GPS signal and an IMU signal; and sends the 3D point cloud image, the hyperspectral image, the GPS signal, and the IMU signal to an image processing device other than a hyperspectral lidar sensor, such that the image processing device fuses the 3D point cloud image and the hyperspectral image based on the GPS signal and the IMU signal. The hyperspectral lidar sensor includes the laser scanner, the spectrometer, the GPS, and the IMU. The present disclosure first calibrates time of other components of the hyperspectral lidar sensor based on the time of the atomic clock of the GPS to synchronize time of the entire sensor with nanosecond-level time of the GPS to ensure time accuracy of the sensor. Then, the spectrometer is triggered by the laser scanner to perform imaging, and an imaging moment of the spectrometer is determined based on a triggering moment of the laser scanner to improve synchronization between an imaging moment of the laser scanner and the imaging moment of the spectrometer, thereby avoiding a geometric error between the hyperspectral image and the 3D point cloud image due to different imaging positions and postures of the laser scanner and the spectrometer. In addition, the laser scanner and the spectrometer share the same GPS signal and IMU signal, that is, they share a same POS data source. In subsequent image fusion using the external image processing device, the hyperspectral image and the 3D point cloud image are prevented from being processed using different POS data sources, to avoid the geometric error between the two images. The above steps are performed progressively to maximally eliminate the geometric error between the hyperspectral image and the 3D point cloud image, thereby improving fusion precision of the hyperspectral image and the 3D point cloud image.

BRIEF DESCRIPTION OF THE DRAWINGS

To describe the technical solutions in the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may still derive other accompanying drawings from these accompanying drawings without creative efforts.

DETAILED DESCRIPTION OF THE EMBODIMENTS

Figure 1:
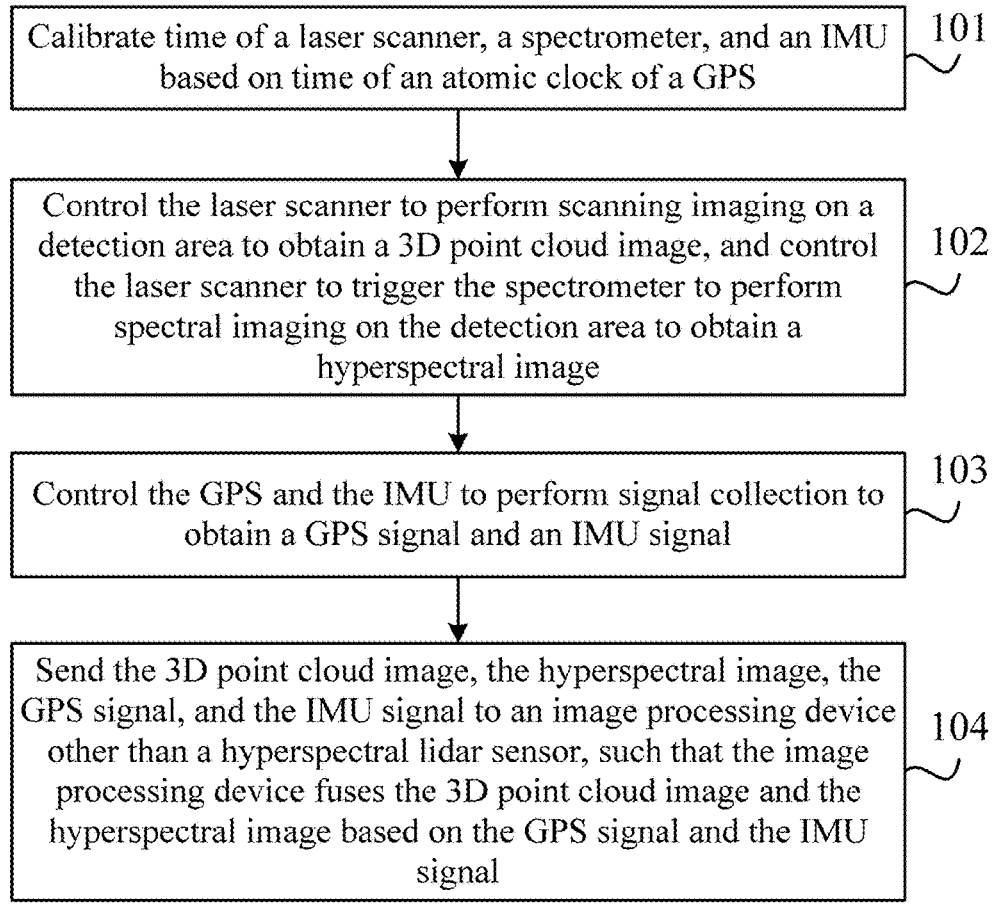
FIG. 1 is a first schematic flowchart of an image fusion method according to an embodiment of the present disclosure.

In order to make the objectives, technical solutions, and advantages of the present disclosure clearer, the following clearly and completely describes the technical solutions in the present disclosure with reference to the accompanying drawings in the present disclosure. Apparently, the described embodiments are some rather than all of the embodiments of the present disclosure. All other embodiments obtained by those of ordinary skill in the art based on the embodiments of the present disclosure without creative efforts should fall within the protection scope of the present disclosure.

It should be noted that in the description of the embodiments of the present disclosure, terms "including/comprising", "containing", or any other variants thereof are intended to cover non-exclusive inclusion, such that a process, a method, an article, or a device that includes a series of elements not only includes those elements, but also includes other elements that are not explicitly listed, or also includes inherent elements of the process, the method, the article, or the device. Without more restrictions, an element defined by a sentence "including/comprising a . . . " does not exclude the existence of other identical elements in a process, a method, an article, or a device that includes the element. An orientation or a positional relationship indicated by a term such as "upper" or "lower" is based on an orientation or a positional relationship shown in the accompanying drawings. These terms are merely intended to facilitate a simple description of the present disclosure, rather than to indicate or imply that the mentioned apparatus or elements must have a specific orientation or be constructed and operated in a specific orientation. Therefore, these terms may not be construed as a limitation to the present disclosure. Unless otherwise clearly specified and limited, terms such as "installation", "interconnection", and "connection" should be understood in a broad sense. For example, the "connection" may be a fixed connection, a detachable connection, or an integral connection; may be a mechanical connection or an electrical connection; may be a direct connection or an indirect connection by means of an intermediate medium; and may be an internal communication between two elements. Those of ordinary skill in the art may understand specific meanings of the above terms in the present disclosure based on specific situations.

The terms such as "first" and "second" in the present disclosure are used to distinguish between similar objects and are not intended to describe a specific order or sequence. It should be understood that data used in such a way may be interchanged under appropriate circumstances, such that the embodiments of the present disclosure can be implemented in an order other than those illustrated or described herein. In addition, the objects distinguished by "first", "second", and the like are usually of one type, and a quantity of the objects is not limited. For example, there may be one or more first objects. In addition, the term "and/or" means at least one of connected objects, and the character "/" generally indicates an "or" relationship between associated objects.

FIG. 1 is a first schematic flowchart of an image fusion method according to an embodiment of the present disclosure.

Figure 2:
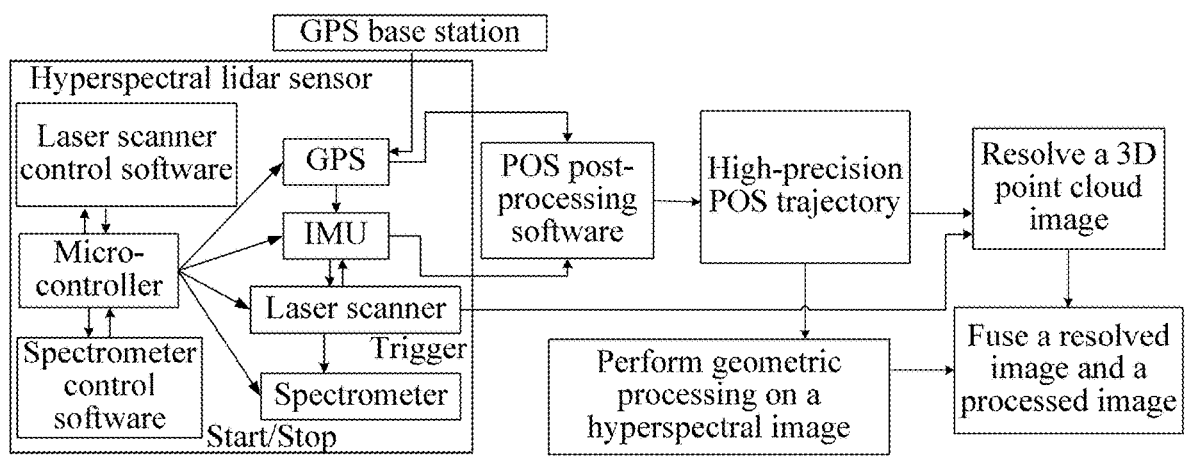
FIG. 2 shows control logic of an image fusion method according to an embodiment of the present disclosure.

FIG. 2 shows control logic of an image fusion method according to an embodiment of the present disclosure.

Referring to FIG. 1 and FIG. 2, an embodiment of the present disclosure provides an image fusion method, which is applied to a microcontroller of a hyperspectral lidar sensor, and can include the following steps:

101: Calibrate time of a laser scanner, a spectrometer, and an IMU based on time of an atomic clock of a GPS.

102: Control the laser scanner to perform scanning imaging on a detection area to obtain a 3D point cloud image, and control the laser scanner to trigger the spectrometer to perform spectral imaging on the detection area to obtain a hyperspectral image.

An imaging moment of the spectrometer is determined based on a triggering moment of the laser scanner.

103: Control the GPS and the IMU to perform signal collection to obtain a GPS signal and an IMU signal.

104: Send the 3D point cloud image, the hyperspectral image, the GPS signal, and the IMU signal to an image processing device other than the hyperspectral lidar sensor, such that the image processing device fuses the 3D point cloud image and the hyperspectral image based on the GPS signal and the IMU signal.

The hyperspectral lidar sensor includes the laser scanner, the spectrometer, the GPS, and the IMU.

In the step 101, a pulse per second (PPS) emitted by the GPS is used as a triggering signal. Every other second, time information data that is of the GPS and received by a GPS antenna, such as National Marine Electronics Association (NMEA) data, is used to continuously calibrate time systems of other components to synchronize time of the entire sensor with nanosecond-level time of the GPS, thereby ensuring nanosecond-level time accuracy of the entire sensor.

In the step 102, while the laser scanner is controlled to perform the scanning imaging on the detection area, the laser scanner is also controlled to trigger the spectrometer to perform the spectral imaging on the detection area, and the imaging moment of the spectrometer is determined based on the triggering moment of the laser scanner to improve synchronization between an imaging moment of the laser scanner and the imaging moment of the spectrometer. Unlike a traditional method in which a PPS signal of the GPS is used to trigger the spectrometer, this embodiment uses the laser scanner to trigger the spectrometer. That is, the laser scanner is controlled to emit a hardware pulse, and the spectrometer detects and recognizes a falling edge signal of the pulse to start the spectral imaging.

It should be noted that due to a high scanning frequency of the laser scanner, a scanning imaging frequency of the laser scanner is usually much higher than a spectral imaging frequency of the spectrometer. That is, in a same time period, a quantity of imaging moments of the laser scanner is much greater than a quantity of imaging moments of the spectrometer. In this embodiment, the synchronization between the imaging moment of the laser scanner and the imaging moment of the spectrometer is not a one-to-one correspondence between the imaging moment of the laser scanner and the imaging moment of the spectrometer, but means that both the laser scanner and the spectrometer perform imaging simultaneously at every same imaging moment within the same time period. For example, if the laser scanner performs five scanning imaging operations within a time period T, the five scanning imaging operations respectively correspond to five imaging moments that are assumed as a moment T1, a moment T2, a moment T3, a moment T4, and a moment T5. If the spectrometer performs three spectral imaging operations within the same time period T, the three spectral imaging operations respectively correspond to three imaging moments. If the three imaging moments are any three of the moment T1, the moment T2, the moment T3, the moment T4, and the moment T5, such as the moment T2, the moment T3, and the moment T5, it can be determined that the imaging moment of the laser scanner and the imaging moment of the spectrometer are synchronized.

In a practical application, there is no strict temporal relationship between the step 102 and the step 103. That is, the step 102 and the step 103 may or may not be executed simultaneously, depending on actual needs. This is not limited herein.

High-throughput perception and high-precision fusion of crop phenotype information is one of core technologies for serving intelligent breeding, which is of great significance for improving breeding efficiency, accelerating breeding of a new variety, and addressing a climate change.

The crop phenotype information usually includes structural information and spectral information. In a traditional method, the structural information is obtained through the laser scanner, and the spectral information is obtained through the spectrometer. Therefore, when the structural information (namely, 3D point cloud image information) and the spectral information (namely, hyperspectral image information) are fused, a geometric error between the 3D point cloud image and the hyperspectral image is caused due to asynchronous imaging moments of the laser scanner and the spectrometer, different POS data sources, or the like, which affects fusion precision and makes it difficult to comprehensively analyze crop growth. The method in this embodiment can be applied to the high-precision fusion of the crop phenotype information.

The image fusion method provided in this embodiment calibrates the time of the laser scanner, the spectrometer, and the IMU based on the time of the atomic clock of the GPS; controls the laser scanner to perform the scanning imaging on the detection area to obtain the 3D point cloud image, and controls the laser scanner to trigger the spectrometer to perform the spectral imaging on the detection area to obtain the hyperspectral image; controls the GPS and the IMU to perform signal collection to obtain the GPS signal and the IMU signal; and sends the 3D point cloud image, the hyperspectral image, the GPS signal, and the IMU signal to the image processing device other than the hyperspectral lidar sensor, such that the image processing device fuses the 3D point cloud image and the hyperspectral image based on the GPS signal and the IMU signal. The hyperspectral lidar sensor includes the laser scanner, the spectrometer, the GPS, and the IMU. This embodiment first calibrates time of different data acquisition units of the hyperspectral lidar sensor based on the time of the atomic clock of the GPS to synchronize the time of the entire sensor with the nanosecond-level time of the GPS to ensure the time accuracy of the sensor. Then, the spectrometer is triggered by the laser scanner to perform the imaging, and the imaging moment of the spectrometer is determined based on the triggering moment of the laser scanner to improve the synchronization between the imaging moment of the laser scanner and the imaging moment of the spectrometer, thereby avoiding the geometric error between the hyperspectral image and the 3D point cloud image due to different imaging positions and postures of the laser scanner and the spectrometer. In addition, the laser scanner and the spectrometer share the same GPS signal and IMU signal, that is, they share a same POS data source. In subsequent image fusion using the external image processing device, the hyperspectral image and the 3D point cloud image are prevented from being processed using different POS data sources, to avoid the geometric error between the two images. The above steps are performed progressively to maximally eliminate the geometric error between the hyperspectral image and the 3D point cloud image, thereby improving fusion precision of the hyperspectral image and the 3D point cloud image.

Further, in terms of the fusion of the crop phenotype information, due to few homonymous features of field crops, traditional geometric registration is more difficult and the process is complex. The method in this embodiment eliminates the geometric error from imaging sources of the laser scanner and the spectrometer, which greatly simplifies a subsequent fusion process, reduces a difficulty of fusion matching, and helps to promote large-scale application in the future.

Further, in a current solution to the problem of the asynchronous imaging moments of the laser scanner and the spectrometer, a complex processing unit such as a field programmable gate array (FPGA) chip is separately installed to achieve time synchronization. This method requires the additional FPGA chip, which is costly. Alternatively, a hardware pulse is generated through a GPS timing module to trigger the imaging of the spectrometer, thereby achieving time synchronization with the laser scanner. This method requires the spectrometer to have a precision clock or a signal feedback function. Alternatively, a soft synchronization method is used, which relies on a relative time relationship between the laser scanner and the spectrometer. Although a cost is low, this method has poor precision and cannot meet high-speed and high-precision collection requirements of the crop phenotype information during movement. The method in this embodiment neither requires an additional processing chip or unit, nor requires the spectrometer to have the precise clock and the signal feedback function. Moreover, after impacts of a current and other factors are considered on a basis of the nanosecond-level atomic clock of the GPS, microsecond-level imaging synchronization precision can be achieved, and low-cost, low-requirement, high-precision synchronization can be achieved between the imaging moments of the laser scanner and the spectrometer, thereby improving precision of subsequent image fusion.

Figure 3:
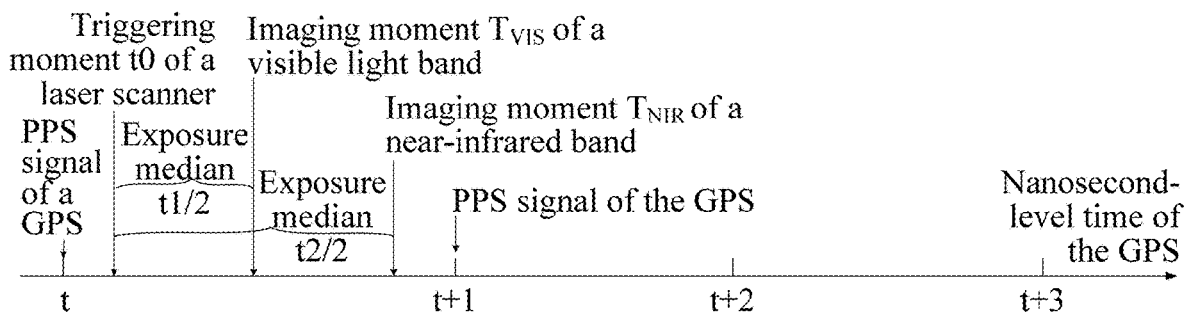
FIG. 3 is a schematic diagram of an imaging moment of a spectrometer in an image fusion method according to an embodiment of the present disclosure.

FIG. 3 is a schematic diagram of the imaging moment of the spectrometer in the image fusion method provided in this embodiment of the present disclosure. Referring to FIG. 3, in an embodiment, the imaging moment of the spectrometer can be determined based on exposure duration of a spectral band and the triggering moment of the laser scanner.

Because the spectrometer also needs to undergo exposure, imaging, storage, transmission, and other procedures upon receiving the triggering signal, the triggering moment is not equal to the imaging moment. Actual exposure time varies for different spectrometers and bands. Assuming that the triggering moment is t0, exposure duration of a visible light band is t1, and exposure duration of a near-infrared band is t2, an imaging moment of the visible light band is $T_{VIS}=t0+t1/2$, and an imaging moment of the near-infrared band is $T_{NIR}=t0+t2/2$. It is also necessary to control the IMU to record these moments at a high frequency.

This embodiment can obtain different imaging moments of the spectrometer in different spectral bands based on the exposure duration of the spectral band and the triggering moment of the laser scanner within the nanosecond-level time of the GPS, thereby improving accuracy of the imaging moments in the different spectral bands.

Figure 4:
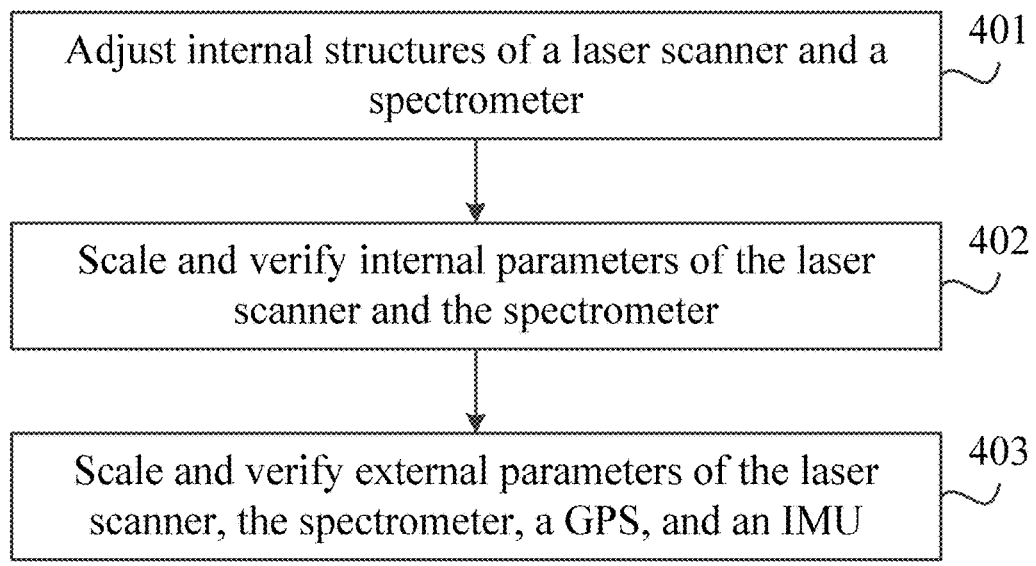
FIG. 4 is a second schematic flowchart of an image fusion method according to an embodiment of the present disclosure.

FIG. 4 is a second schematic flowchart of an image fusion method according to an embodiment of the present disclosure. Referring to FIG. 4, in an embodiment, before calibrating the time of the laser scanner, the spectrometer, and the IMU based on the time of the atomic clock of the GPS, the image fusion method may include the following steps:

401: Adjust internal structures of the laser scanner and the spectrometer.

402: Scale and verify internal parameters of the laser scanner and the spectrometer.

403: Scale and verify external parameters of the laser scanner, the spectrometer, the GPS, and the IMU.

In the step 401, the internal structures of the laser scanner and the spectrometer can be adjusted by using tools such as a uniform light source, a parallel light tube, and a collimating optical system.

In terms of the laser scanner, installation, adjustment, and imaging quality inspection of an opto-mechanical system of the laser scanner, precise adjustment of an axis angle of a rotation center of a high-frequency motor of the laser scanner, precise adjustment of a central optical axis angle of a scanning mirror of the laser scanner, and the like are performed.

In terms of the spectrometer, installation and adjustment of a focal plane component of a detector of the spectrometer, installation, adjustment, and imaging quality inspection of an opto-mechanical system of the spectrometer, and the like are performed.

In the step 402, the internal parameter of the laser scanner includes a deviation angle between a laser ray and an actual rotation axis, and a deviation angle between an axis of the scanning mirror and the actual rotation axis. The actual rotation axis is an actual axis of the rotation center of the high-frequency motor.

The internal parameter of the spectrometer includes a distance between horizontally adjacent pixels on a focal plane of the detector of the spectrometer, a distance between vertically adjacent pixels on the focal plane of the detector of the spectrometer, a radial distortion level of a lens of the spectrometer, a position of an origin of a coordinate system of the hyperspectral image on the focal plane of the detector in a pixel coordinate system, and a focal length of the spectrometer. When the radial distortion level is negative, barrel distortion occurs. When the radial distortion level is positive, pillow distortion occurs. In addition, the internal parameter of the spectrometer also includes a radial distortion parameter and a tangential distortion parameter of the lens of the spectrometer.

In the step 403, the external parameters of the laser scanner, the spectrometer, the GPS, and the IMU include relative positions between their respective center positions and center positions of the other three components. For example, the external parameter of the laser scanner includes relative parameter between a center position of the laser scanner and a center position of the spectrometer, a relative parameter between the center position of the laser scanner and a center position of the GPS, and a relative parameter between the center position of the laser scanner and a center position of the IMU.

In a process of assembling the components of hyperspectral lidar sensor, due to an inability to achieve ideal technologies, placement angles, and the like of the components, an error may be caused between data from a plurality of components, resulting in an imaging geometric error between the laser scanner and the spectrometer, and ultimately resulting in an image fusion error.

In order to address the imaging geometric error in an assembling process of the hyperspectral lidar sensors, this embodiment adopts integrated precision installation and adjustment, internal scaling and verification, external scaling and verification, and other steps to ensure absolute assembling precision of a single component and the entire hyperspectral lidar sensor. This further improves the fusion precision of the hyperspectral image and the 3D point cloud image, keeping a geometric deviation between the two images at around one pixel without a need for complex post-processing such as registration.

Figure 5:
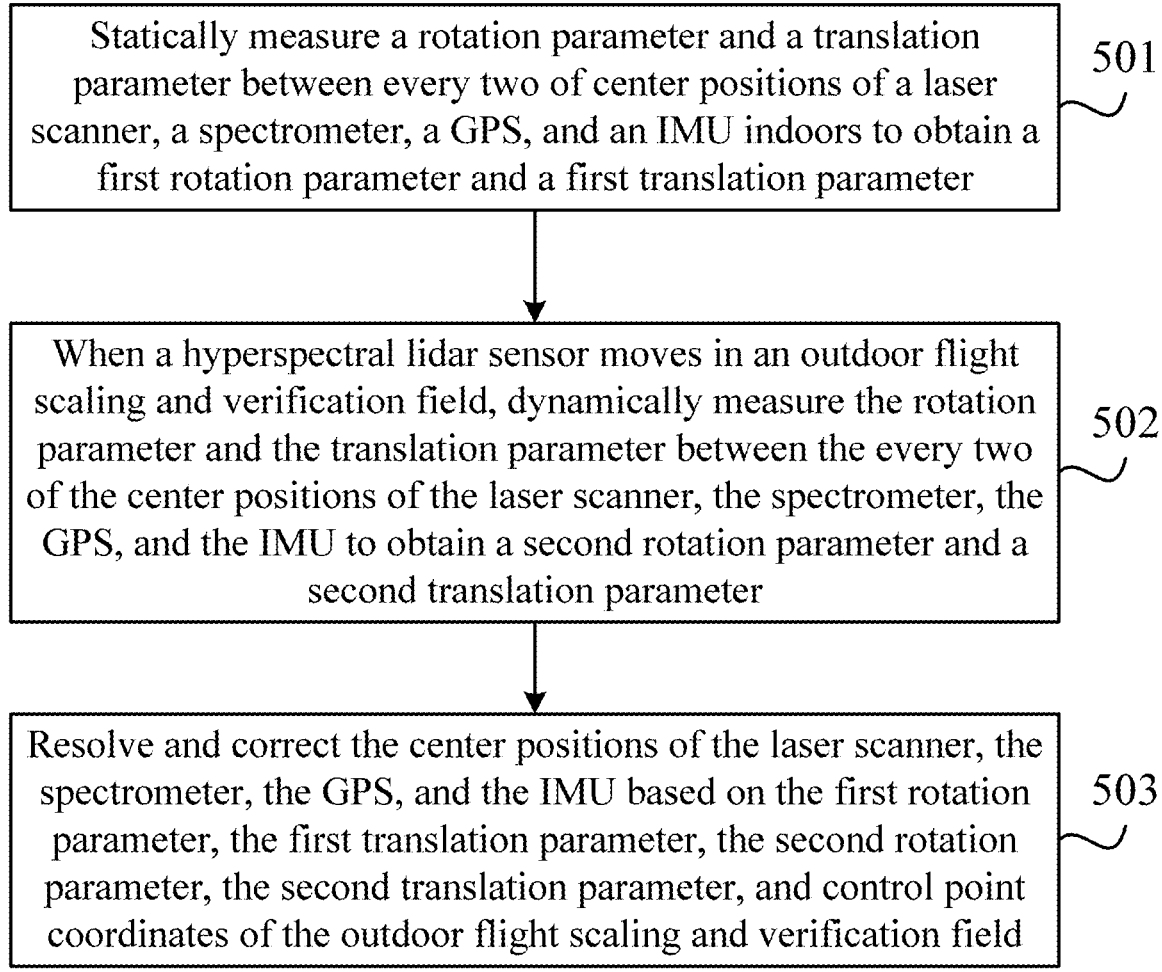
FIG. 5 is a third schematic flowchart of an image fusion method according to an embodiment of the present disclosure.

FIG. 5 is a third schematic flowchart of an image fusion method according to an embodiment of the present disclosure. Referring to FIG. 5, in an embodiment, the scaling and verifying external parameters of the laser scanner, the spectrometer, the GPS, and the IMU may include the following steps:

501: Statically measure a rotation parameter and a translation parameter between every two of the center positions of the laser scanner, the spectrometer, the GPS, and the IMU indoors to obtain a first rotation parameter and a first translation parameter.

502: When the hyperspectral lidar sensor moves in an outdoor flight scaling and verification field, dynamically measure the rotation parameter and the translation parameter between the every two of the center positions of the laser scanner, the spectrometer, the GPS, and the IMU to obtain a second rotation parameter and a second translation parameter.

503: Resolve and correct the center positions of the laser scanner, the spectrometer, the GPS, and the IMU based on the first rotation parameter, the first translation parameter, the second rotation parameter, the second translation parameter, and control point coordinates of the outdoor flight scaling and verification field.

The rotation parameters are a deviation between rotation angles of the every two center positions relative to a Y-axis, namely a pitch angle deviation, a deviation between the rotation angles of the every two center positions relative to an X-axis, namely a roll angle deviation, and a deviation between the rotation angles of the every two center positions relative to a Z-axis, namely a yaw angle deviation. The translation parameters are a positional deviation between the every two center positions on the X-axis, a positional deviation between the every two center positions on the Y-axis, and a positional deviation between the every two center positions on the Z-axis.

This embodiment combines the indoor static parameters, the outdoor dynamic parameters, and the outdoor control point parameters to repeatedly resolve and correct the center positions of the components of the hyperspectral lidar sensor, such that positions of the components are accurately scaled.

Figure 6:
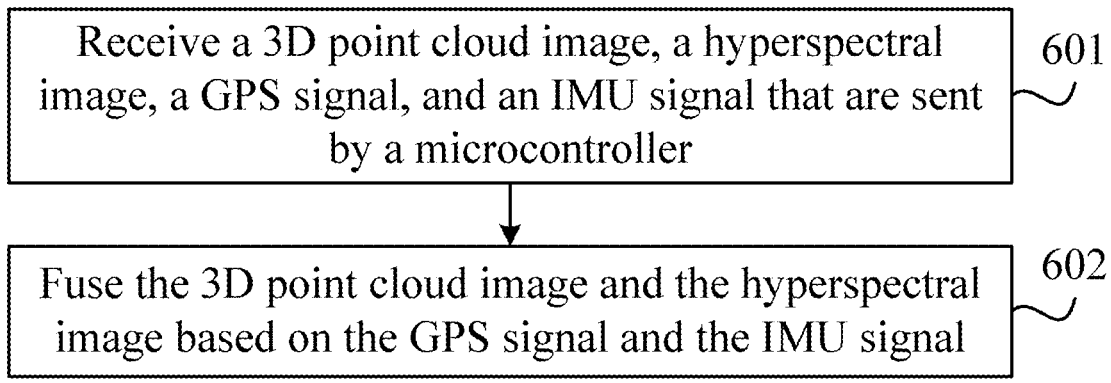
FIG. 6 is a fourth schematic flowchart of an image fusion method according to an embodiment of the present disclosure.

FIG. 6 is a fourth schematic flowchart of an image fusion method according to an embodiment of the present disclosure. Referring to FIG. 6, an embodiment of the present disclosure provides an image fusion method, which is applied to an image processing device other than a hyperspectral lidar sensor, and may include the following steps:

601: Receive a 3D point cloud image, a hyperspectral image, a GPS signal, and an IMU signal that are sent by a microcontroller.

602: Fuse the 3D point cloud image and the hyperspectral image based on the GPS signal and the IMU signal.

The 3D point cloud image is obtained by the microcontroller controlling a laser scanner to perform scanning imaging on a detection area, the hyperspectral image is obtained by the microcontroller controlling the laser scanner to trigger a spectrometer to perform spectral imaging on the detection area, the GPS signal is collected by a GPS under control of the microcontroller, the IMU signal is collected by an IMU under the control of the microcontroller, and an imaging moment of the spectrometer is determined based on a triggering moment of the laser scanner.

The hyperspectral lidar sensor includes the laser scanner, the spectrometer, the GPS, and the IMU.

In the image fusion method provided in this embodiment, the hyperspectral image is obtained by using the laser scanner to trigger the spectrometer to perform imaging, and the imaging moment of the spectrometer is determined based on the triggering moment of the laser scanner. This can improve synchronization between an imaging moment of the laser scanner and the imaging moment of the spectrometer, thereby avoiding a geometric error between the hyperspectral image and the 3D point cloud image due to different imaging positions and postures of the laser scanner and the spectrometer. In addition, the laser scanner and the spectrometer share the same GPS signal and IMU signal, that is, they share a same POS data source. In image fusion, the hyperspectral image and the 3D point cloud image are prevented from being processed using different POS data sources, to avoid the geometric error between the two images. In this way, the geometric error between the hyperspectral image and the 3D point cloud image is maximally eliminated, thereby improving fusion precision of the hyperspectral image and the 3D point cloud image.

Figure 7:
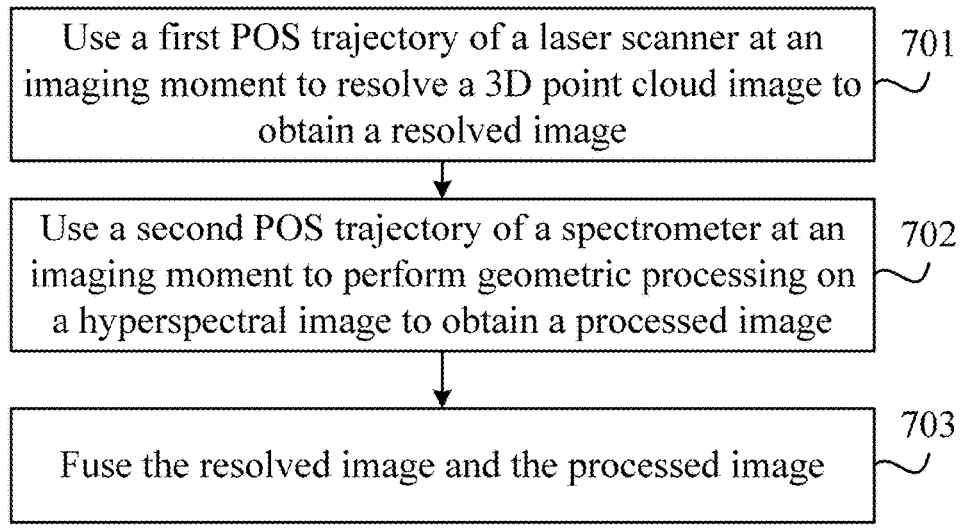
FIG. 7 is a fifth schematic flowchart of an image fusion method according to an embodiment of the present disclosure.

FIG. 7 is a fifth schematic flowchart of an image fusion method according to an embodiment of the present disclosure.

Figure 8:
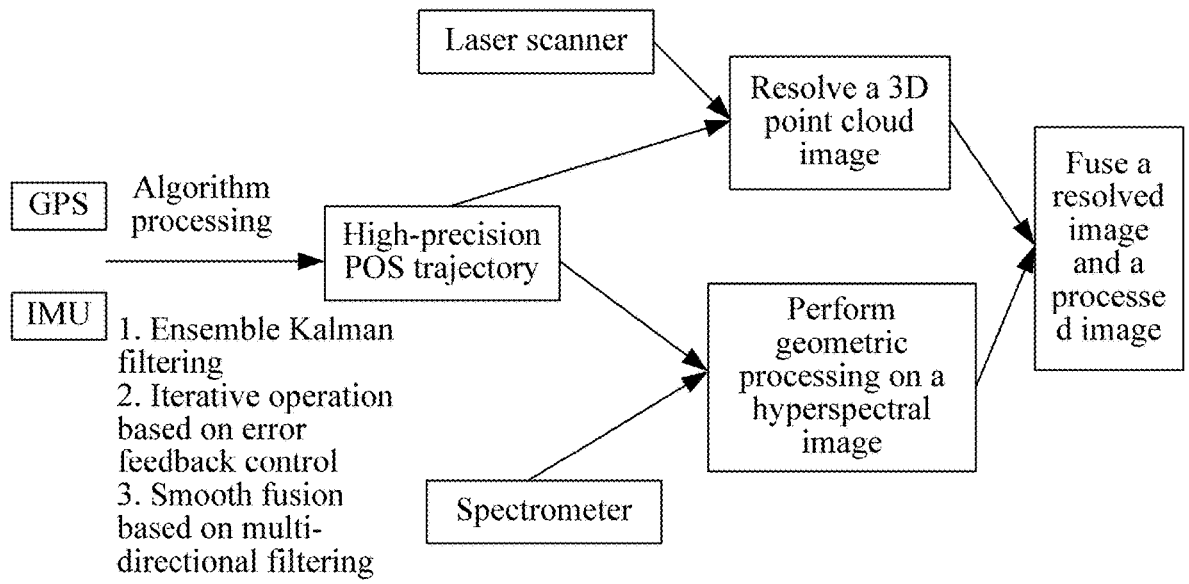
FIG. 8 shows a mechanism of sharing a POS data source in an image fusion method according to an embodiment of the present disclosure.

FIG. 8 shows a mechanism of sharing a POS data source in an image fusion method according to an embodiment of the present disclosure.

Referring to FIG. 7 and FIG. 8, in an embodiment, the fusing the 3D point cloud image and the hyperspectral image based on the GPS signal and the IMU signal may include the following steps:

701: Use a first POS trajectory of the laser scanner at the imaging moment to resolve the 3D point cloud image to obtain a resolved image.

702: Use a second POS trajectory of the spectrometer at the imaging moment to perform geometric processing on the hyperspectral image to obtain a processed image.

The first POS trajectory and the second POS trajectory come from the same POS data source, and the POS data source is determined based on the GPS signal and the IMU signal.

703: Fuse the resolved image and the processed image.

In the steps 701 and 702, the laser scanner and the spectrometer share the same POS data source to obtain positions and postures at their respective imaging moments to obtain their respective POS trajectories. For example, the laser scanner obtains its own positions and postures at moments T1, T2, T3, T4, and T5 from the POS data source to obtain the first POS trajectory. The spectrometer obtains its own positions and postures at moments T2, T3, and T5 from the POS data source to obtain the second POS trajectory.

In a practical application, there is no strict temporal relationship between the step 701 and the step 702. That is, the step 701 and the step 702 may or may not be executed simultaneously, depending on actual needs. This is not limited herein.

In this embodiment, the laser scanner and the spectrometer obtain POS trajectories at their respective imaging moments from the same POS data source, and process and fuse their respective images, which can achieve a unified POS data source on a basis of imaging moment synchronization, thereby improving precision of image fusion.

Referring to FIG. 8, in an embodiment, the POS data source can be determined based on a following method:

determining, based on the GPS signal and the IMU signal, a POS trajectory along which the hyperspectral lidar sensor moves in the detection area, and determining the POS trajectory along which the hyperspectral lidar sensor moves in the detection area as the POS data source.

Algorithm processing including ensemble Kalman filtering, iterative error feedback, and multi-directional filtering smooth and fusion can be performed on the GPS signal and the IMU signal to obtain a more accurate POS trajectory of the hyperspectral lidar sensor. An execution order of various algorithms is not limited, and the GPS signal is obtained based on a GPS base station.

The POS trajectory is a high-precision POS trajectory, and its frequency is the same as that of the IMU, with a typical frequency of 200 Hz.

This embodiment can improve precision of the POS trajectory by performing the algorithm processing on the GPS signal and the IMU signal. This provides a high-precision POS data source for subsequent resolving of the 3D point cloud image and geometric processing of the hyperspectral image.

Referring to FIG. 2, an embodiment of the present disclosure provides a hyperspectral lidar sensor, which may include a microcontroller, a laser scanner, a spectrometer, a GPS, and an IMU.

The microcontroller is configured to:

calibrate time of the laser scanner, the spectrometer, and the IMU based on time of an atomic clock of the GPS;

control the laser scanner to perform scanning imaging on a detection area to obtain a 3D point cloud image, and control the laser scanner to trigger the spectrometer to perform spectral imaging on the detection area to obtain a hyperspectral image, where an imaging moment of the spectrometer is determined based on a triggering moment of the laser scanner;

control the GPS and the IMU to perform signal collection to obtain a GPS signal and an IMU signal; and send the 3D point cloud image, the hyperspectral image, the GPS signal, and the IMU signal to an image processing device other than the hyperspectral lidar sensor, such that the image processing device fuses the 3D point cloud image and the hyperspectral image based on the GPS signal and the IMU signal.

The hyperspectral lidar sensor in this embodiment first calibrates time of other components of the hyperspectral lidar sensor based on the time of the atomic clock of the GPS to synchronize time of the entire sensor with nanosecond-level time of the GPS to ensure time accuracy of the sensor. Then, the spectrometer is triggered by the laser scanner to perform imaging, and the imaging moment of the spectrometer is determined based on the triggering moment of the laser scanner to improve synchronization between an imaging moment of the laser scanner and the imaging moment of the spectrometer, thereby avoiding a geometric error between the hyperspectral image and the 3D point cloud image due to different imaging positions and postures of the laser scanner and the spectrometer. In addition, the laser scanner and the spectrometer share the same GPS signal and IMU signal, that is, they share a same POS data source. In subsequent image fusion using the external image processing device, the hyperspectral image and the 3D point cloud image are prevented from being processed using different POS data sources, to avoid the geometric error between the two images. The above steps are performed progressively to maximally eliminate the geometric error between the hyperspectral image and the 3D point cloud image, thereby improving fusion precision of the hyperspectral image and the 3D point cloud image.

In an embodiment, the laser scanner is a surveying-grade laser scanner, and the spectrometer is a hyperspectral snapshot camera.

In addition, a red/green/blue (RGB) digital, multispectral, thermal infrared, or depth camera and other sensors can be mounted on the hyperspectral lidar sensor.

The microcontroller is equipped with laser scanner control software and spectrometer control software. The laser scanner control software is configured to configure a pulse interval of triggering the spectrometer by the laser scanner, while the spectrometer control software is configured to configure an imaging function of the spectrometer and record imaging data.

Existing laser scanners include a vehicle-mounted laser scanner and an airborne laser scanner. Although the vehicle-mounted laser scanner is easy to operate and inexpensive, it has poor precision that is generally at a centimeter level, and is not suitable for obtaining a refined structure of a crop. The airborne laser scanner has a small mass, a high point cloud density, and high precision, but it is expensive and difficult to promote on a large scale. The surveying-grade laser scanner used in this embodiment is preferably a high-performance core component such as a laser transceiver or a scanning mirror, to ensure repeated precision of less than 5 millimeters for distance measurement at a 100-meter altitude, and a point cloud density of not less than 200 points per square meter for a single strip at the 100-meter altitude. In this way, refined 3D phenotype analysis can be performed on a stem and leaf distribution, a plant height, and other aspects for a field crop.

There are two types of existing hyperspectral instruments: a traditional linear push-broom hyperspectral instrument and a video-type hyperspectral instrument. Limited by a principle of the linear push-broom hyperspectral instrument, when the linear push-broom hyperspectral instrument is applied to airborne, vehicle-mounted, and other mobile platforms, a hyperspectral image of the linear push-broom hyperspectral instrument will be distorted due to vibration, which poses great difficulties for subsequent geometric processing such as image stitching and correction, and also limits a size of an obtained phenotype throughput of the crop. The video-type hyperspectral instrument can be used on the mobile platform, but it is expensive. The hyperspectral snapshot camera used in this embodiment is not a linear scan hyperspectral camera, which can synchronize imaging at a high speed, has small geometric distortion in an image, and simplifies a subsequent geometric processing process. In addition, a drone does not require a separate gimbal for stabilization. Therefore, the hyperspectral snapshot camera has a lower cost, more applicability scenarios, and stronger practicality.

Some existing hyperspectral lidar sensors cannot meet a demand for high-throughput and high-precision obtaining of phenotype information of the field crop, and some existing hyperspectral lidar sensors are too large and bulky, and are only suitable for indoor or large manned vehicle platforms, and cannot be mounted on agile platforms such as a light and small drone and an unmanned vehicle.

The hyperspectral lidar sensor in this embodiment has a small volume. Firstly, the surveying-grade laser scanner is selected. A point cloud density is 4 to 6 times a point cloud density of a traditional laser scanner, and point cloud precision has been improved from a traditional automotive-grade error of over 8 centimeters to a surveying-grade error of less than 3 centimeters, thereby making it possible to finely obtain and analyze a 3D structural phenotype of the crop. Secondly, the hyperspectral snapshot camera is selected, which is insensitive to the vibration of the mobile platform such as the drone, and can ensure precision of the geometric processing such as the image stitching no matter whether the stabilizing gimbal is installed, thereby greatly improving an application scope and practicality, and simplifying subsequent stitching processing of a linear array image. Therefore, the hyperspectral lidar sensor that integrates the surveying-grade laser scanner and the hyperspectral snapshot camera can be mounted on the agile platform such as the drone or the unmanned vehicle, and meet the demand for the high-throughput and high-precision obtaining of the phenotype information of the field crop.

Further, spectral resolution of the spectrometer is less than 8 nanometers.

A spectral imaging band of the spectrometer includes a band near 531 nanometers, a band near 570 nanometers, a band distributed between 540 nanometers and 570 nanometers, a band distributed between 670 nanometers and 780 nanometers, a distributed band between 620 nanometers and 670 nanometers, a band distributed between 780 nanometers and 860 nanometers, and a band near 865 nanometers.

41 bands suitable for vegetation detection can be preferably selected within a spectral band range of 450 nanometers to 900 nanometers. The band near 531 nanometers and the band near 570 nanometers are selected for stress detection and photosynthesis detection of vegetation. At least 3 bands distributed between 540 nanometers and 570 nanometers are selected to depict a reflection peak of green light. At least 12 bands distributed between 670 nanometers and 780 nanometers are selected to accurately depict a red-edge curve and represent nutrient stress. At least 4 bands distributed between 620 nanometers and 670 nanometers are selected to depict a valley of red light, at least 6 bands distributed between 780 nanometers and 860 nanometers are selected to depict a curve shape of near-infrared light, and the band near 865 nanometers is selected for water stress detection.

Specifically, center wavelengths of these 41 bands can be 531 nanometers, 539 nanometers, 547 nanometers, 556 nanometers, 563 nanometers, 570 nanometers, 583 nanometers, 593 nanometers, 604 nanometers, 614 nanometers, 623 nanometers, 633 nanometers, 643 nanometers, 651 nanometers, 659 nanometers, 669 nanometers, 697 nanometers, 701 nanometers, 709 nanometers, 713 nanometers, 721 nanometers, 728 nanometers, 732 nanometers, 740 nanometers, 747 nanometers, 755 nanometers, 764 nanometers, 769 nanometers, 778 nanometers, 785 nanometers, 793 nanometers, 801 nanometers, 806 nanometers, 815 nanometers, 821 nanometers, 830 nanometers, 838 nanometers, 843 nanometers, 852 nanometers, 859 nanometers, and 865 nanometers.

This embodiment can ensure high-precision obtaining of physiological and biochemical phenotype information of the crop through the preferred 41 typical vegetation-sensitive spectral bands. In addition, a key feature of a spectral curve of the vegetation can be completely depicted by using the 41 bands only, avoiding production of hundreds of bands at a high cost in a traditional method and achieving a balance between a cost and performance.

An embodiment of the present disclosure provides a hyperspectral lidar system, which may include an image processing device and the hyperspectral lidar sensor described above.

The image processing device is configured to:
receive a 3D point cloud image, a hyperspectral image, a GPS signal, and an IMU signal that are sent by a microcontroller; and
fuse the 3D point cloud image and the hyperspectral image based on the GPS signal and the IMU signal.

Referring to FIG. 2, the image processing device can perform algorithm processing on the GPS signal and the IMU signals through POS post-processing software installed on the device. The software may be NovAtel Inertial Explorer software.

The hyperspectral lidar system in this embodiment can calibrate time of a laser scanner, a spectrometer, and an IMU based on time of an atomic clock of a GPS to synchronize time of the entire sensor with nanosecond-level time of the GPS to ensure time accuracy of the sensor. Then, the spectrometer is triggered by the laser scanner to perform imaging, and an imaging moment of the spectrometer is determined based on a triggering moment of the laser scanner to improve synchronization between an imaging moment of the laser scanner and the imaging moment of the spectrometer, thereby avoiding a geometric error between the hyperspectral image and the 3D point cloud image due to different imaging positions and postures of the laser scanner and the spectrometer. From same POS data, a first POS trajectory is obtained to resolve the 3D point cloud image, and a second POS trajectory is obtained to perform geometric processing on the hyperspectral image, to prevent the hyperspectral image and the 3D point cloud image from being processed using different POS data sources, to avoid the geometric error between the two images. The above steps are performed progressively to maximally eliminate the geometric error between the hyperspectral image and the 3D point cloud image, thereby improving fusion precision of the hyperspectral image and the 3D point cloud image.

Finally, it should be noted that the foregoing embodiments are merely used to explain the technical solutions of the present disclosure, but are not intended to limit the same. Although the present disclosure is described in detail with reference to the foregoing embodiments, those of ordinary skill in the art should understand that they can still modify the technical solutions described in the foregoing embodiments, or make equivalent substitutions on some technical features therein. These modifications or substitutions do not make the essence of the corresponding technical solutions deviate from the spirit and scope of the technical solutions of the embodiments of the present disclosure.

What is claimed is:

1. An image fusion method, applied to a microcontroller of a hyperspectral lidar sensor, and comprising:
calibrating time of a laser scanner, a spectrometer, and an inertial measurement unit (IMU) based on time of an atomic clock of a global positioning system (GPS);
controlling the laser scanner to perform scanning imaging on a detection area to obtain a three-dimensional (3D) point cloud image, and controlling the laser scanner to trigger the spectrometer to perform spectral imaging on the detection area to obtain a hyperspectral image, wherein an imaging moment of the spectrometer is determined based on a triggering moment of the laser scanner;
controlling the GPS and the IMU to perform signal collection to obtain a GPS signal and an IMU signal; and
sending the 3D point cloud image, the hyperspectral image, the GPS signal, and the IMU signal to an image processing device other than the hyperspectral lidar sensor, such that the image processing device fuses the 3D point cloud image and the hyperspectral image based on the GPS signal and the IMU signal; wherein
the hyperspectral lidar sensor comprises the laser scanner, the spectrometer, the GPS, and the IMU;
before the calibrating time of a laser scanner, a spectrometer, and an IMU based on time of an atomic clock of a GPS, the method comprises:
adjusting internal structures of the laser scanner and the spectrometer;
scaling and verifying internal parameters of the laser scanner and the spectrometer; and
scaling and verifying external parameters of the laser scanner, the spectrometer, the GPS, and the IMU; and
the scaling and verifying external parameters of the laser scanner, the spectrometer, the GPS, and the IMU comprises:
statically measuring a rotation parameter and a translation parameter between every two of center positions of the laser scanner, the spectrometer, the GPS, and the IMU indoors to obtain a first rotation parameter and a first translation parameter;
when the hyperspectral lidar sensor moves in an outdoor flight scaling and verification field, dynamically measuring the rotation parameter and the translation parameter between the every two of the center positions of the laser scanner, the spectrometer, the GPS, and the IMU to obtain a second rotation parameter and a second translation parameter; and
resolving and correcting the center positions of the laser scanner, the spectrometer, the GPS, and the IMU based on the first rotation parameter, the first translation parameter, the second rotation parameter, the second translation parameter, and control point coordinates of the outdoor flight scaling and verification field.

2. A hyperspectral lidar sensor, comprising a microcontroller, a laser scanner, a spectrometer, a GPS, and an IMU, wherein the microcontroller is configured to implement the image fusion method according to claim 1;

the laser scanner is a surveying-grade laser scanner;

the spectrometer is a hyperspectral snapshot camera;

spectral resolution of the spectrometer is less than 8 nanometers; and a spectral imaging band of the spectrometer comprises a band near 531 nanometers, a band near 570 nanometers, a band distributed between 540 nanometers and 570 nanometers, a band distributed between 670 nanometers and 780 nanometers, a band distributed between 620 nanometers and 670 nanometers, a band distributed between 780 nanometers and 860 nanometers, and a band near 865 nanometers.

3. A hyperspectral lidar system, comprising an image processing device and the hyperspectral lidar sensor according to claim 2, wherein the image processing device is configured to:

receive a 3D point cloud image, a hyperspectral image, a GPS signal, and an IMU signal that are sent by a microcontroller; and fuse the 3D point cloud image and the hyperspectral image based on the GPS signal and the IMU signal.

* * * * *